United States Patent
Kugler

(10) Patent No.: US 10,044,557 B2
(45) Date of Patent: Aug. 7, 2018

(54) CONFIGURATION METHOD FOR A WIRING SYSTEM

(71) Applicant: Siemens Aktiengesellschaft, Munich (DE)

(72) Inventor: Reinhold Kugler, Neunkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 234 days.

(21) Appl. No.: 14/834,530

(22) Filed: Aug. 25, 2015

(65) Prior Publication Data

US 2016/0080199 A1    Mar. 17, 2016

(30) Foreign Application Priority Data

Sep. 11, 2014   (EP) .................................... 14184335

(51) Int. Cl.
*H04L 12/28* (2006.01)
*H04L 12/24* (2006.01)
*H04W 4/80* (2018.01)
*G05B 19/042* (2006.01)
*H04W 4/00* (2018.01)

(52) U.S. Cl.
CPC ........ *H04L 41/0806* (2013.01); *G05B 19/042* (2013.01); *H04W 4/008* (2013.01); *H04W 4/80* (2018.02); *H04L 41/0886* (2013.01)

(58) Field of Classification Search
CPC ................................................ H04L 41/0806
USPC ............................................................ 370/255
See application file for complete search history.

(56) References Cited

U.S. PATENT DOCUMENTS

| | | | |
|---|---|---|---|
| 2004/0066402 A1* | 4/2004 | Maehara | G06F 17/50 715/744 |
| 2006/0082817 A1 | 4/2006 | Crosier | |
| 2008/0120370 A1* | 5/2008 | Chan | G06Q 10/10 709/204 |
| 2010/0222895 A1 | 9/2010 | Seiler | |
| 2012/0236769 A1 | 9/2012 | Powell | |
| 2013/0072252 A1 | 3/2013 | Chen | |

\* cited by examiner

*Primary Examiner* — Shripal Khajuria
(74) *Attorney, Agent, or Firm* — Cozen O'Connor

(57) ABSTRACT

A method (100) for configuring a wireless connection (30) between a control component (10) and a first field component (20) of a wiring system (11). Circuit information (40) of the wiring system (11) is first provided. A wired connection (42) between the control component (10) and the first field component (20) is then captured. A first radio network address (12) is then assigned to the control component (10), wherein the first radio network address (12) corresponds to a first end (46) of the wired connection (42). Similarly, a second radio network address (22) is assigned to the first field component (20), wherein the second radio network address (22) corresponds to a second end (48) of the wired connection (42). Linkage information (50) that includes the first and second radio network addresses (12, 22) is then provided to the control component (10) to define a wireless connection (30) between the control component (10) and the first field component (20).

24 Claims, 3 Drawing Sheets

CONFIGURATION METHOD FOR A WIRING SYSTEM

FIELD OF THE INVENTION

The present invention relates to a method for configuring a wiring system in the field of automation engineering. It is further directed to a computer program and a development tool for implementing the configuration method of the invention.

BACKGROUND OF THE INVENTION

US Patent Application Publication US2010222895A1 discloses a field device that is wirelessly connected to a higher-level unit via a HART protocol communication bus. The field device is provided with a communication interface and a correspondingly associated functional unit that is operable in a clocked mode. In clocked operation, phases alternate with an activated functional unit and a deactivated functional unit. The field device is configured using a HART handheld communicator, which initially sends to the field device a wake-up signal, and then sends configuration commands and configuration data to the field device in the form of digital signals.

A wireless bus system station, which is marketed by the firm of Schildknecht under the name DATAEAGLE, is also known in the art. Such bus system stations are designed to set up a connection to and exchange data with field devices by means of GPRS, Bluetooth, ZigBee or WLAN. WirelessHART adapters, to which field devices can be connected, are also known. Both HART-compatible and non-HART-compatible field devices can be connected to the WirelessHART adapter. Such WirelessHART adapters are for example marketed by PHOENIX CONTACT Deutschland GmbH.

One disadvantage of known wireless bus systems is that they are quite costly to design and configure. In complex systems connecting a plurality of field devices, the assignment and addressing of wireless connections is correspondingly costly and, importantly, error prone. Furthermore, in currently known configuration methods it is not possible to automate the process of configuring a wired system down to the level of an individual wired connection that extends between two connecting terminals; such wiring has instead always been manually implemented.

It is accordingly an object of the present invention to make available a facility which permits fast and reliable addressing and configuration of wirelessly interconnected control components and field components and which overcomes the disadvantages of the prior art. These objects are achieved by the inventive methods and the associated computer program and corresponding development tool as herein taught and described.

SUMMARY OF THE INVENTION

In one implementation of the inventive method a wireless connection between a control component and a first field component, which are associated with a wiring system, is established and configured. In a first step circuit information, in which the structure of the wiring system is mapped, is provided. A wired connection between the control component and the first field component is then captured. The wired connection provides a link between the control component and the first field component, and is delineated a cable-bound connection during the design of the wiring system. The captured wired connection, which is intended to ultimately be replaced by a wireless connection, corresponds to the simplest possible form of connection between the control component and the first field component.

In a further step, the control component is assigned a first radio network address which corresponds to a first end of the theretofore captured wired connection. The first end of the wired connection is that end of the wired connection that faces the control component. The first field component is then assigned a second radio network address which corresponds to a second end of the captured wired connection; the second end of the wired connection is that end of the wired connection that faces the first field component. The radio network addresses assigned to the first and second ends of the wired connection can be any form of addressing suitable for use in a wireless communication system. Linkage information, which comprises the first and second radio network addresses, is then provided. This linkage information is stored in the control component and/or in the first field component for use in the operation of the wiring system.

Another implementation of the inventive method establishes and configures a wireless connection between a first field component and a second field component, which are associated with a wiring system. In a first step circuit information, in which the structure of the wiring system is mapped, is provided. A wired connection between the first field component and the second field component is then captured. The wired connection is a link between the first field component and the second field component; during the design of the wiring system, this wired connection is delineated a cable-bound connection, which corresponds to the simplest possible form of connection between the first and second field components. The wired connection will, after set up, ultimately be replaced by an intended wireless connection.

The first field component is then assigned a first radio network address, which corresponds to a first end of the captured wired connection. The first end of the wired connection is that end of the wired connection which faces the first field component. the second field component is similarly assigned a second radio network address, which corresponds to a second end of the captured wired connection; the second end of the wired connection is that end of the wired connection which faces the second field component. The radio network addresses assigned to the first and second ends of the wired connection can be any form of addressing suitable for use in a wireless communication system. In a further step linkage information, which comprises the first and second radio network addresses is provided and stored in the first field component and/or in the second field component for use in the operation of the wiring system.

The inventive methods provide a notably simplified, more efficient and more robust way of assigned addressing of individual control components and field components for wireless intercommunication, in a manner which is far less prone to errors. Using this methodology even complex networks containing a plurality of control components and field components can be reliably constructed. The inclusion of the circuit information in the inventive methods provides recourse to data which is in any case present during the design of a wiring system, so that the system's wireless connections can be planned and configured at an early stage. The inventive methods can moreover be implemented in software which is used to plan the wiring system, so that the configuration of the wiring system can take place in an automated and expedited manner.

In a preferred embodiment of the inventive methods the capture of the wired connection takes place on the basis of a type identifier which is stored in the circuit information. The type identifier can by way of illustration be information about which tasks are to be performed via the ultimately intended wireless connection. For example, a measured data channel via which intensive data traffic passes can be identified using the type identifier. This may be a line from a sensor with a high sampling rate and extensive data packets. Furthermore, the type identifier can be used to identify a field device which is installed at a difficult-to-access location and for which wireless configuration is accordingly preferred.

In the inventive methods the circuit information may by way of illustration comprise CAD information and/or an electronic circuit diagram. CAD information and electronic circuit diagrams are suitable for compactly delineating and storing the circuit information used in the inventive method and can be easily updated in the event of changes in planning the wiring system. Moreover, CAD information and electronic circuit diagrams are in any event normally available in the planning of wiring systems, and the inventive method can thus easily be incorporated into the configuration of the wiring system at an early stage. The inventive methods can accordingly be efficiently incorporated into existing work processes.

In currently preferred forms of the inventive methods, the wireless connection can be designed for implementation as (by way of illustration) a Bluetooth connection, a ZigBee connection, a W-LAN connection, or an acoustic or optical connection. Bluetooth, W-LAN and/or ZigBee connections are robust and powerful wireless connections, via which large quantities of data can be quickly and reliably transported. An acoustic connection can be designed as an ultrasound connection; whereas an optical connection can be a laser connection or an infrared connection. The inventive methods are thus suitable, using wireless connections, for providing transport paths for both digital and analog signals. Wireless connections set up in accordance with the inventive methods can furthermore be designed for bidirectional communication.

In a preferred embodiment of the invention, a plurality of wired connections is present between a first field component and either a control component or a second field component. In accordance with the invention, a plurality of wired connections is preferably captured. One end of a wired connection at the first field component, the second field component and/or the control component is designated an access point. The respective first and second ends of the plurality of the wired connections are correspondingly assigned multiple radio network addresses. The plurality of first and second radio network addresses are then combined in the linkage information. Preferably the plurality of wired connections are combined such that a plurality of first ends of the wired connections is assigned a plurality of first radio network addresses and is included in combined form in the linkage information. Similarly, a plurality of second ends of the wired connections is assigned a plurality of second radio network addresses and is included in combined form in the same linkage information as the plurality of first radio network addresses. The linkage information, which in each instance comprises a plurality of first and second radio network addresses, is designed to set up a wireless connection, replacing a plurality of wired connections, in each case via an individual radio unit at the first field component, the second field component and/or the control component. The radio unit—which as used herein means an implementation of wireless communication intended and suitable for use in providing a selected form of wireless communication—of the control component, the first field component and/or the second field component thus integrates a plurality of access points.

Preferably the linkage information in the inventive method is configured or implemented so that it can be read and executed without further processing when the control component, the first field component and/or the second field component is booted up. This enables shortening of a start-up phase of the control device or of a field component. The start-up phase can take place, by way of example, after a system or component shutdown or repair or after a reset necessitated or instructed by the software.

In implementing the inventive methods, the first field component and/or the second field component may by way of illustration be a sensor, an actuator, a switchgear or a safety device. In a particularly preferred embodiment, the first and/or the second field component may be a low-voltage switchgear. The wiring configuration of, and the wiring itself, of low-voltage switchgears as a type of field component have heretofore been implemented in small steps, and have been costly and prone to error. The inventive methods provide a facility to automatically, quickly and reliably configure and logically interconnect low-voltage switchgears for a wireless connection to a control component or to one another. The inventive methods are moreover accommodate a broad range of possible control and field components and can thus be used for numerous applications. And, as well, the relevant method steps of the invention can be performed separately for each individual field component in the wiring system, which enhances the rapid and efficient configuration of a plurality of field components.

The inventive computer software program may be stored on any suitable storage medium and operatively implements the inventive methodology. The computer program is preferably designed for execution in a memory of a computer in conjunction with CAD software. In this way a simple and reliable integration is achieved into available technical aids which are employed in the design and planning of a wiring system, and the inventive program can thus be efficiently integrated into existing work processes.

The inventive development tool, which may by way of illustration be implemented as a computer, comprises an input interface for capturing circuit information for a wiring system. The development tool also includes an output interface to output linkage information to a control component and/or a field component of the wiring system, and is provided with a memory and a computing unit. The development tool is configured and intended to implement the inventive methods via its individual components. In preferred forms the computing unit is implemented as a microcontroller and the memory as firmware of a control component and/or of a field component.

A development tool in accordance with the invention can easily receive existing CAD data and information from an electronic circuit diagram, and can thus configure wireless connections at an early stage of work during the design of a wiring system. The development tool accordingly enables the inventive method to be readily incorporated into existing work processes and thereby advantageously increases efficiency in the application and use of the inventive methods.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
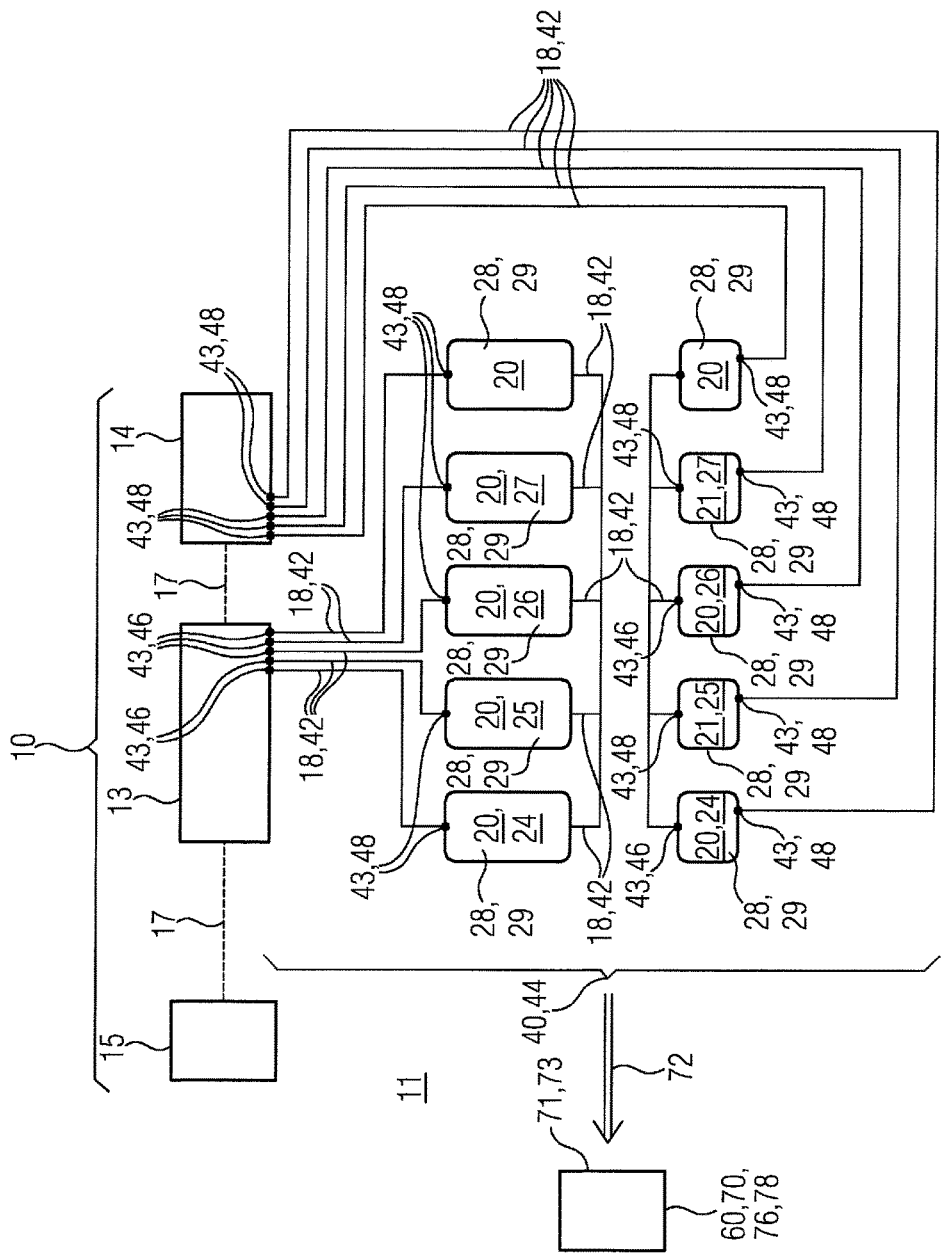
FIG. 1 schematically depicts a structure of a wiring system in the form of circuit information which serves as the starting point for the inventive methods.

FIG. 1 schematically depicts and maps a structure of a wiring system 11, as mapped in the form of circuit information 40 which, by way of illustration, is available and presented as CAD information 44. FIG. 1 shows the initial form of the wiring system, on the basis of which the inventive methods 100 initiate their processes. The wiring system 11 comprises a control component 10 which has an input unit 13, an output unit 14 and a computing unit 15. The input unit 13, output unit 14 and computing unit 15 are interconnected via internal connections 17 and together form and function as the assembled control component 10. The wiring system 11 additionally comprises a plurality of first field components 20 and second field components 21. The first field components 20 are operable to provide different functions and accordingly have different designs and constructions. The wiring system 11 that is mapped in FIG. 1 comprises as first field components 20 sensors 24, an actuator 25, switchgears 26 and a safety device 27. Each of the first field components 20 has a microcontroller 28 which in each case serves as a computing unit. Likewise, each of the first field components is equipped with a memory 29, which interacts with the corresponding microcontroller 28 to capture signals from the respective first field component 20 and to transmit those signals to the control component 10 or to process signals received from the control component 10.

The second field components 21 of the wiring system 11 are at least similar to, if not substantially the same in design as, the first field components 20. The various second field components 21 each fulfill different functions in wiring system 11 and are designed and constructed accordingly. Thus, one second field component 21 is an actuator 25, whereas another second field component 21 is a safety device 27. The second field components 21 each have a memory 28 and an associated microcontroller 27 which serves as a computing unit for that second field component.

Figure 2:
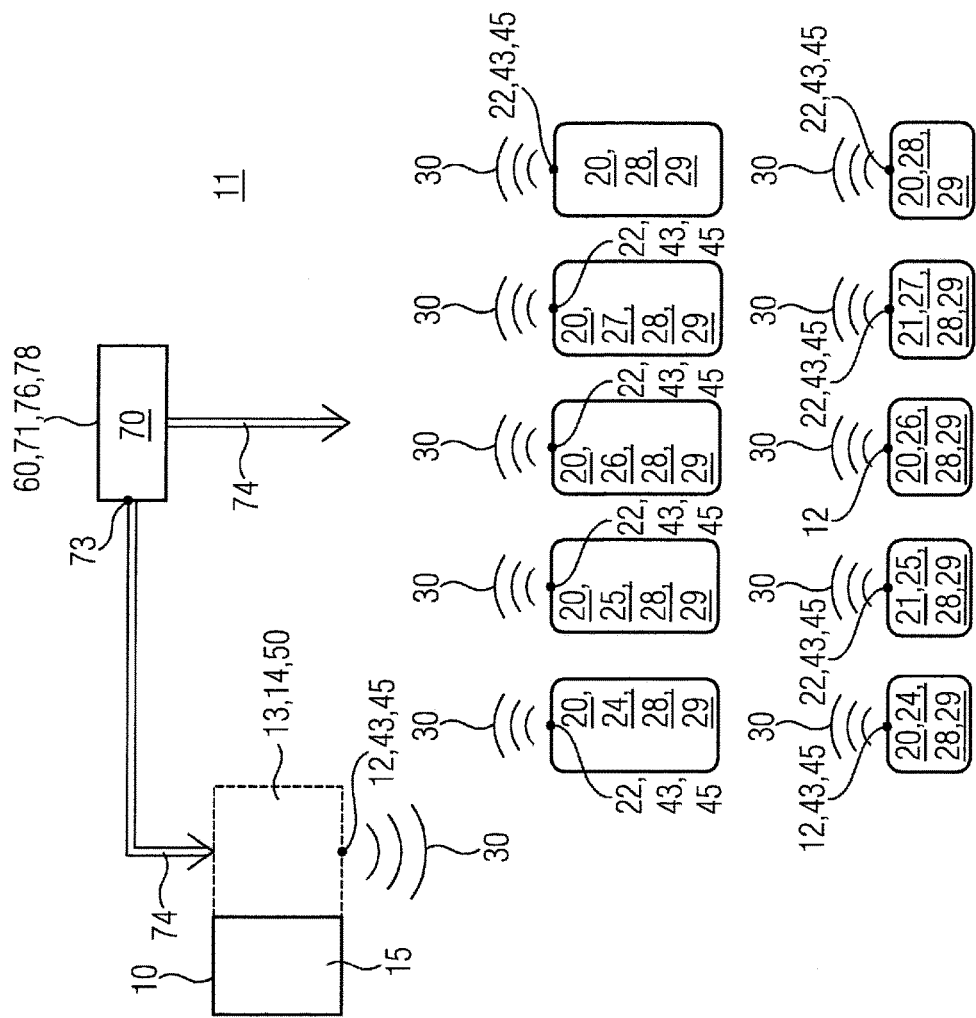
FIG. 2 semi-schematically depicts a structure of a wiring system in the form of circuit information after execution of the inventive methods.

The wiring system 11, as mapped, further includes a plurality of wired connections 42 which, starting from the input unit 13 or the output unit 14, set up a connection to the first field components 20 and the second field components 21. The wired connections 42 comprise logical links which are present within the circuit or switching information 40 and define a functional relationship between the connected first and second field components 20, 21 and the control component 10. Each of the wired connections 42 is provided with an associated type identifier 18 that contains information about the respective wired connection 42. The information stored or contained in the type identifier 18 describes, among other things, the configuration in which the respective wired connection 42 should be set up during ultimate construction of the wiring system, as well as information about the purposes served by the relevant wired connection 42. The type identifier 18 thus by way of illustration identifies, in the inventive methods 100, whether a wired connection 42 is to be replaced by a wireless connection 30 (FIG. 2). The wired connections 42 which interconnect the various first and second field components 20, 21 are also each provided with a type identifier 18.

FIG. 1 shows access points 43 at both the input unit 13 and the output unit 14 of control component 10, each coupled to a wired connection 42. The access point 43 comprises a channel, via which information is fed to control component 10 by means of the respective wired connection 42 from a signal in the corresponding wired connection 42. Each access point 43 is connected to a first end 46 of the wired connections 42, and each such first end is identified and provided with a first radio network address 12. At the opposite second end 48 of each respective wired connection 42 a coupling is set up with a first or a second field component 20, 21. The first end 46 and the corresponding second end 48 of each wired connection 42 are characterized by linkage information 50 that is generated in the inventive methods 100.

The wiring system 11 according to FIG. 1, which is mapped as circuit information 40, is captured by a development tool 70 in a first step 110 (FIG. 3) of the inventive methods in the course of a data access. This capture 72 passes the captured circuit information to the input interface 71 of development tool 70. The development tool 70 is further provided with an output interface 73 for the output 74 of information. The development tool 70 additionally has a memory 76 and a computing unit 78 which are operable to store and execute a program 60 that implements the inventive methods 100.

FIG. 2 depicts the design of the wiring system 11 (corresponding to that of FIG. 1) after the method steps and processing of the inventive methods 100. As seen in FIG. 2, the processed wiring system 11 comprises control component 10 with computing unit 15, input unit 13 and output unit 14. The functions of the input unit 13 and output unit 14 after methods 100 have been completed are, in contrast to the system design (FIG. 1) at the start of methods 100, effected wirelessly. Linkage information 50 is stored in control component 10 and comprises the first and second radio network addresses 12, 22. Between the control component 10 and the first field components 20 are wireless connections 30, via which measured data, control commands and error messages are wirelessly exchanged between the first field components 20 and control component 10. The various first field components 20 are differently implemented by virtue of their respective functions and may comprise sensors 24, actuators 25, switchgears 26 and/or safety devices 27. Each of the first field components 20 includes a microcontroller 28 and a memory 27, and is also capable of storing linkage information 50. The first field components 20 are each assigned a first radio network address 12 or a second radio network address 22. A first field component 20 with a second radio network address 22 is coupled to a first radio network address 12 of the control component 10 via linkage information 50. The assignment of first and second radio network addresses 12, 22 defines a wireless connection 30 between an access point 43 of control component 10 and a first field component 20. The control component 10 and the first and second field components 20, 21 are each equipped with a radio unit 45, via which the data traffic of the respective wireless connection 30 is handled. These wireless connections 30 are configured and set up using at least a first embodiment of the inventive methods 100.

In addition, first field components 20 with a first radio network address 12 are coupled via linkage information 50 to a second field component 21 that has a second radio network address 22. In this manner a wireless connection 30 is defined between an access point 43 of a first field component 20 and an access point 43 of a second field component 21. These wireless connections 30 are likewise configured and set up in the course of at least a second embodiment of the inventive methods.

It is contemplated that the first and second field components 20, 21 in this second embodiment are essentially identical in construction, each having a microcontroller 28 and a memory 29, for capturing and storing corresponding linkage information 50. The linkage information 50 is preferably stored in the memories 29 of the first and second field components 20, 21 so that the linkage information 50 can be read out and used without further processing when the first and second field components 20, 21 are booted up. The linkage information 50 is assigned to the control component 10 and to the first and second field components 20, 21 by development tool 70 that includes, in addition to input interface 71, output interface 73 via which an output 74 of the linkage information 50 is effected. The development tool is further provided with a memory 76 and a computing unit 78, which enable execution of a program 60 that implements the inventive methods 100.

Figure 3:
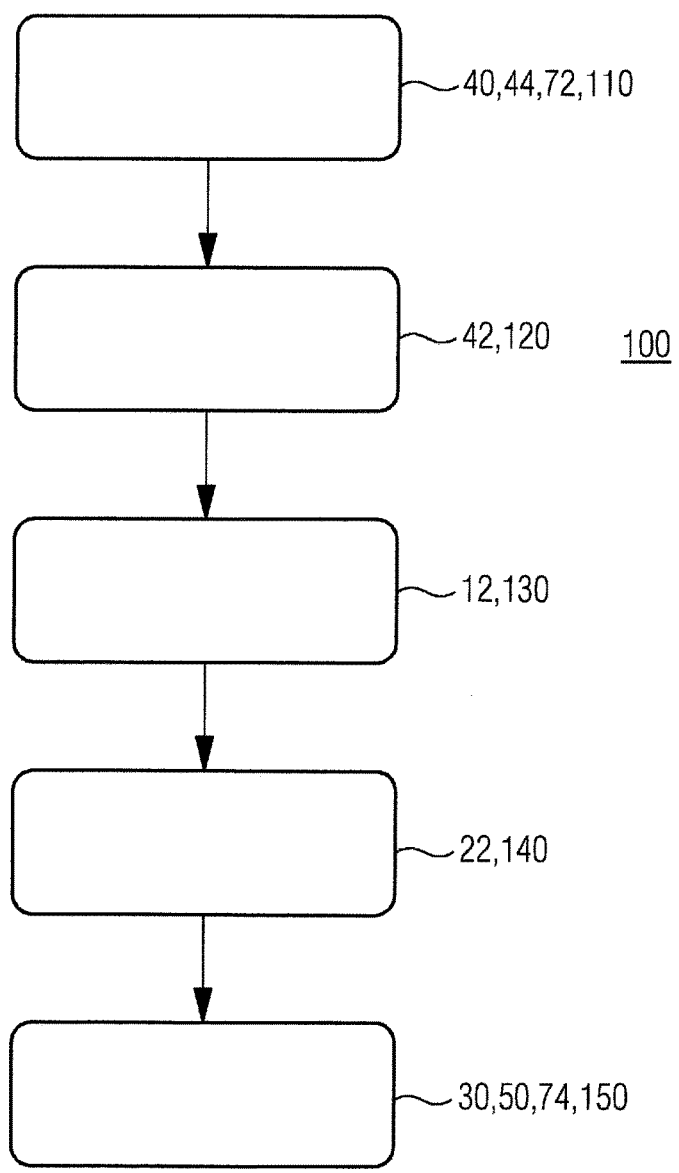
FIG. 3 is a flow chart of the inventive methods.

FIG. 3 is a block diagram that shows the preferred sequence of inventive methods 100; the process steps will first be described in accordance with the first embodiment of the inventive method. In first step 110 the circuit information 40 which is embodied as CAD information 44 is obtained by way of a data access 72 (FIG. 1) that reads the circuit information into development tool 70. In the next or second step 120 the provided circuit information 40 of the wired connection 42 between the first field component 20 and control component 10—which wired connection is intended to ultimately be replaced by a wireless connection 30—is captured. In the next or third step 130 the first end 46 of the captured wired connection 42 is assigned a first radio network address 12. Similarly, in the fourth step 140 the second end 48 of the captured data connection 42 is assigned a second radio network address 22. Finally, in the next or fifth step 150 linkage information 50, which comprises the first and second radio network addresses 12, 22, is passed to control component 10 by output 74 of the development tool 70. The output 74 thus defines the wireless connection 30 to be implemented between the first field component 20 and the control component 10. As a result the first inventive method 100 is realized.

In the second embodiment of inventive method 100, the first step 110 is the same as that described in connection with the first embodiment. In second step 120, the wired connection 42 between the first and second field component 20, 21—which wired connection is intended to be ultimately replaced by a wireless connection 30—is captured. As in the first embodiment of the inventive method 100, in the third and fourth steps 130, 140 each of the first and second ends 46, 48 of the wired connection 42 are assigned respective first and second radio network addresses 12, 22. In fifth method step 150, the first and second radio network addresses 12, 22 of wired connection 42 are combined to define linkage information 50 and linkage information 50 is output by development tool 70, completing operation of the inventive method and, thus, automated set up and configuration of the wiring system.

While there have shown and described and pointed out fundamental novel features of the invention as applied to preferred embodiments thereof, it will be understood that various omissions and substitutions and changes in the form and details of the components and devices illustrated, and in their operation, and in the methods described, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for configuring a wireless connection (30) between a control component (10) and a first field component (20) from automation technology, comprising the steps of:
   a) providing circuit information (40) for a wiring system (11), said circuit information (40) comprising CAD information (44) and mapping a structure of the wiring system (11);
   b) capturing a wired connection (42) between the control component (10) and the first field component (20) from the automation technology;
   c) assigning a first radio network address (12) to the control component (10), wherein the first radio network address (12) corresponds to a first end (46) of the wired connection (42);
   d) assigning a second radio network address (22) to the field component (12), wherein the second radio network address (22) corresponds to a second end (48) of the wired connection (42); and
   e) providing linkage information (50), comprising the first and second radio network addresses (12, 22), to the control component (10) to configure the wireless connection (30) between the control component (10) and the first field component (20) from the automation technology.

2. The method as claimed in claim 1, wherein said capturing of the wired connection (42) is effected based on a type identifier (18) stored in the circuit information (40).

3. The method as claimed in claim 1, wherein the circuit information (40) further comprises an electronic circuit diagram (46).

4. The method as claimed in claim 1, wherein the wireless connection (30) is configured as one of a Bluetooth connection, a ZigBee connection, a WLAN connection, an acoustic connection and an optical connection.

5. The method as claimed in claim 1, wherein the wireless connection (30) is configured to be bidirectional.

6. The method as claimed in claim 1, wherein in step b) a plurality of wired connections (42) is captured, in steps c) and d) a plurality of first and second radio network addresses (12, 22) are respectively assigned to the plural wired connections, and in step e) the plurality of first and second radio network addresses (12, 22) is provided in the linkage information (50).

7. The method as claimed in claim 1, wherein the linkage information (50) is provided for operating a radio unit (45) in at least one of the first field component (20) and the control component (10).

8. The method as claimed in claim 1, wherein the linkage information (50) is stored in at least one of the first field component (20) and the control component (10) for direct readout by the said at least one of the first field component and the control component at bootup thereof.

9. The method as claimed in claim 1, wherein the first field component (20) is configured as one of a sensor (24), an actuator (25), a switchgear (26), and a safety device (27).

10. The method as claimed in claim 1, wherein each of the steps a) to e) are performed once for each of a plurality of the first field components (20) in the wiring system (11).

11. A computer software program (60) that is stored on a non-transitory storage medium and is executable by a processor to perform the method of claim 1.

12. A method for configuring a wireless connection (30) between a first field component (20) and a second field component (21) from automation technology, comprising the steps of:
a) providing circuit information (40) for a wiring system (11), said circuit information (40) comprising CAD information (44) and mapping a structure of the wiring system (11);
b) capturing a wired connection (42) between the first field component (20) and the second field component (21) from the automation technology;
c) assigning a first radio network address (12) to the first field component (20), wherein the first radio network address (12) corresponds to a first end (46) of the wired connection (42);
d) assigning a second radio network address (22) to the second field component (21), wherein the second radio network address (22) corresponds to a second end (48) of the wired connection (42); and
e) providing linkage information (50), comprising the first and second radio network address (12, 22), to at least one of the first and second field components (20, 21) to configure the wireless connection (30) between the first field component (20) and the second field component (21) from the automation technology.

13. The method as claimed in claim 12, wherein said capturing of the wired connection (42) is effected based on a type identifier (18) stored in the circuit information (40).

14. The method as claimed in claim 12, wherein the circuit information (40) further comprises an electronic circuit diagram (46).

15. The method as claimed in claim 12, wherein the wireless connection (30) is configured as one of a Bluetooth connection, a ZigBee connection, a WLAN connection, an acoustic connection and an optical connection.

16. The method as claimed in claim 12, wherein the wireless connection (30) is configured to be bidirectional.

17. The method as claimed in claim 12, wherein in step b) a plurality of wired connections (42) is captured, in steps c) and d) a plurality of first and second radio network addresses (12, 22) are respectively assigned to the plural wired connections, and in step e) the plurality of first and second radio network addresses (12, 22) is provided in the linkage information (50).

18. The method as claimed in claim 12, wherein the linkage information (50) is provided for operating a radio unit (45) in at least one of the first field component (20) and the second field component (21).

19. The method as claimed in claim 12, wherein the linkage information (50) is stored in at least one of the first field component (20) and the second field component (21) for direct readout by the said at least one of the first field component and the second field component at bootup thereof.

20. The method as claimed in claim 12, wherein each of the first field component (20) and the second field component (21) is configured as one of a sensor (24), an actuator (25), a switchgear (26), and a safety device (27).

21. The method as claimed in claim 12, wherein each of the steps a) to e) is performed once for each of a plurality of the first field components (20) and the second field components (21) in the wiring system (11).

22. A computer software program (60) that is stored on a non-transitory storage medium and is executable by a processor to perform the method of claim 12.

23. A development tool (70), comprising an input interface (71) for capturing (72) circuit information (40) for a wiring system (11), an output interface (73) for providing output (74) of linkage information (50) to at least one of a control component (10) and a field component (20, 21) of the wiring system (11), a memory (76), and a computing unit (78), operable for performing a method as claimed in claim 1.

24. A development tool (70), comprising an input interface (71) for capturing (72) circuit information (40) for a wiring system (11), an output interface (73) for providing output (74) of linkage information (50) to at least one of a first control component (20) and a second field component (21) of the wiring system (11), a memory (76), and a computing unit (78), configured and operable for performing the method as claimed in claim 12.

* * * * *